United States Patent [19]
Murakami et al.

[11] Patent Number: 5,383,821
[45] Date of Patent: Jan. 24, 1995

[54] SPEED REDUCER

[76] Inventors: Hiroshi Murakami, 7-7-303, Hiranohigashi 4-chome, Hirano-ku, Osaka; Tetsu Sakaida, No. 1306, Asahi Plaza, 65-68, Numa 1-chome, Yao-shi, Osaka, both of Japan

[21] Appl. No.: 131,381

[22] Filed: Oct. 5, 1993

[30] Foreign Application Priority Data

Feb. 9, 1993 [JP] Japan .................................. 5-021144

[51] Int. Cl.⁶ ...................................................... F16H 1/28
[52] U.S. Cl. ........................................................... 475/164
[58] Field of Search ................................... 475/163, 164

[56] References Cited

U.S. PATENT DOCUMENTS 3,895,540 7/1975 Davidson ............................ 475/164

FOREIGN PATENT DOCUMENTS 656683 8/1951 United Kingdom ................ 475/164
1545019 2/1990 U.S.S.R. ............................. 475/164

Primary Examiner—Allan D. Herrmann
Attorney, Agent, or Firm—Wenderoth, Lind & Ponack

[57] ABSTRACT

A speed reducer has simple in structure with a few number of parts and yet can provide a large reduction ratio. Side plates are arranged opposite to each other and are formed on the surfaces thereof opposite to each other with fixed gears. An input shaft is supported by one of the side plates. An input plate having an inclined surface is fixed to the inner end of the input shaft. An output shaft is supported by the other side plate. An output plate is mounted on the output shaft through a universal joint and is kept in contact with the inclined surface of the input plate through a plurality of balls. The output plate is provided with movable gears on both sides thereof near its outer circumference and is swayed in such a way that the teeth of the movable gears are brought into meshing engagement with the fixed gears one after another.

1 Claim, 5 Drawing Sheets

SPEED REDUCER

BACKGROUND OF THE INVENTION

1. Field of the Invention

This invention relates to a speed reducer which has a simple in structure but can provide a large reduction ratio.

2. Description of the Related Art

Conventional speed reducers include ones comprising a plurality of spur gears combined in the form of a gear train, one comprising planet gears and ones using pulleys and belts.

Any of such conventional speed reducers can provide only a small reduction ratio. In order to increase the reduction ratio, it was necessary to use a large number of gears or to use worm gears. Either of these solutions leads to an increase in the size of the device or to a reduction in the power transmission efficiency.

SUMMARY OF THE INVENTION

An object of this invention has an to provide a speed reducer which is extremely simple in structure with a small number of parts and which can provide a large reduction ratio.

There is provided according to this invention a speed reducer comprising a pair of side plates arranged opposite to each other and formed on their surfaces opposite to each other with ring-shaped protrusions so as to be concentric with and spaced apart from each other, the protrusions being provided on their surfaces opposite to each other with fixed gears, an input shaft rotatably extending through the center of one of the side plates, a circular input plate fixed to the inner end of the input shaft, one of the two surfaces of the input plate that faces the other of the side plates being inclined with respect to the center of rotation of the input plate, an output shaft rotatably extending through the center of the other of the side plates, an output plate mounted on the inner end of the output shaft through a universal joint so as to be rotatable with and inclinable relative to the output shaft, the output plate being provided on both sides thereof near its outer circumference with movable gears each having teeth whose number is different from the number of teeth of each fixed gear and is adapted to be brought into meshing engagement with the fixed gears, the output plate being arranged so as to be kept substantially parallel to the inclined surface of the input plate while it sways as the input plate rotates, whereby the teeth of the movable gears are brought into meshing engagement with the fixed gears on the protrusions one after another at diametrically opposite positions from each other.

As the input shaft rotates, the input plate secured thereto rotates, so that its inclined surface on the output side also rotates.

Since the output plate is in contact with the inclined surface of the input plate through balls, in sways about the universal joint as the input plate rotates.

Thus, the teeth of the gears on both sides of the output plate will be brought into meshing engagement, one after another, with the fixed gears. Since there is a difference between the number of teeth of the gear on each side of the output plate and that of each fixed gear, the output plate and thus the output shaft rotate slightly with respect to the input shaft.

The rotation of the input shaft is thus reduced significantly when transmitted to the output shaft.

According to this invention, as the input shaft is rotated, the output plate sways in such a way that the gears formed on both sides thereof are brought into engagement with the fixed gear, whose number of teeth is different from that of the gears on the output plate. The rotation of the input shaft is thus transmitted to the output shaft. Such a speed reducer has a much simpler structure, is much more compact and provides a large reduction ratio, Although it comprises a much smaller number of part, than any conventional speed reducer.

Further, a fairly large number of teeth are in meshing engagement at a time. This makes it possible to transmit a sufficiently large torque even if the gears are thin.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

FIRST EMBODIMENT

In the embodiment shown in FIGS. 1-5, a ring-shaped frame 1 is secured to an unillustrated supporting base. On both sides of the frame 1, side plates 2 are fixed opposite to each other.

Figure 3:
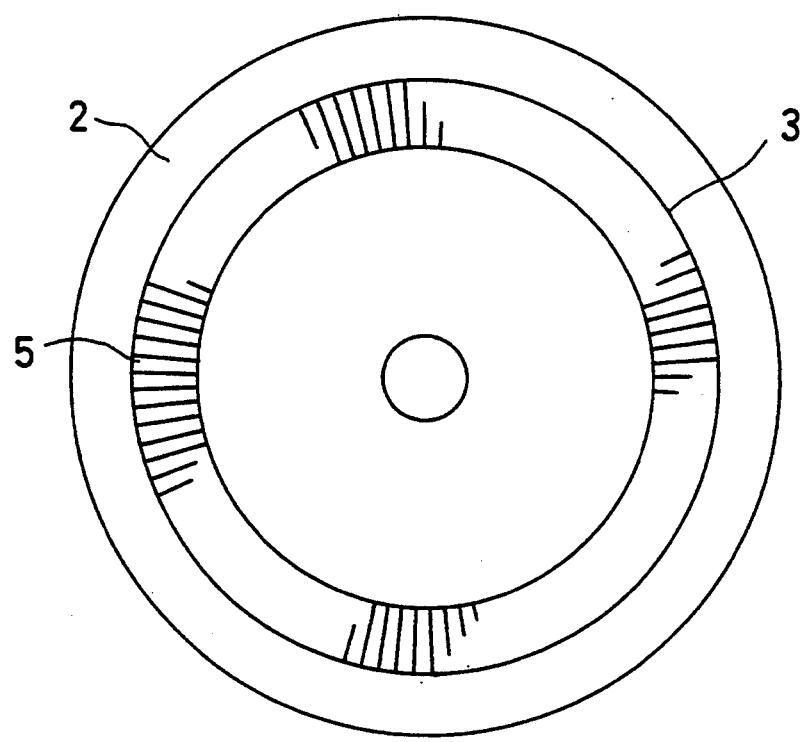
FIG. 3 is a front view of the side plate.
Figure 4:
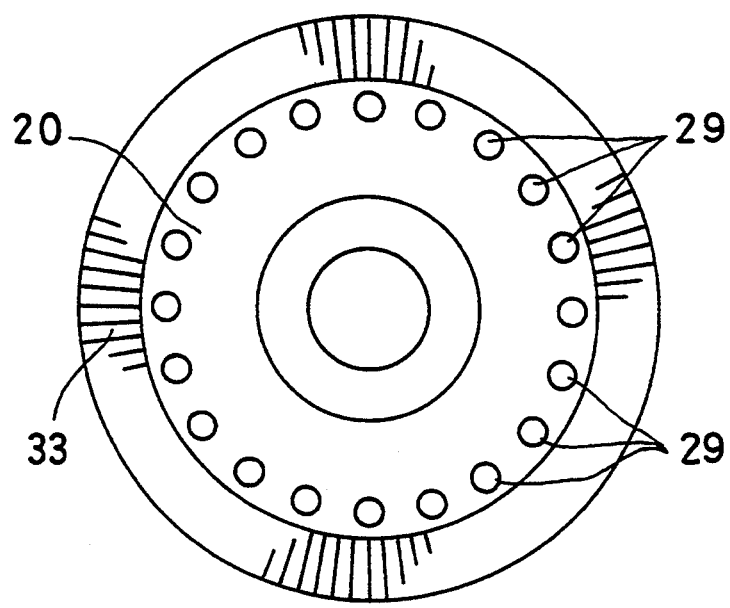
FIG. 4 is a front view of the output plate.

The side plates 2 are provided on their inner surfaces near their outer circumference with ring-shaped protrusions 3 which are concentric and integral with main bodies of the plates 2. The protrusions 3 have on their opposing surfaces radial fixed gears 5 as shown in FIG. 3.

Figure 1:
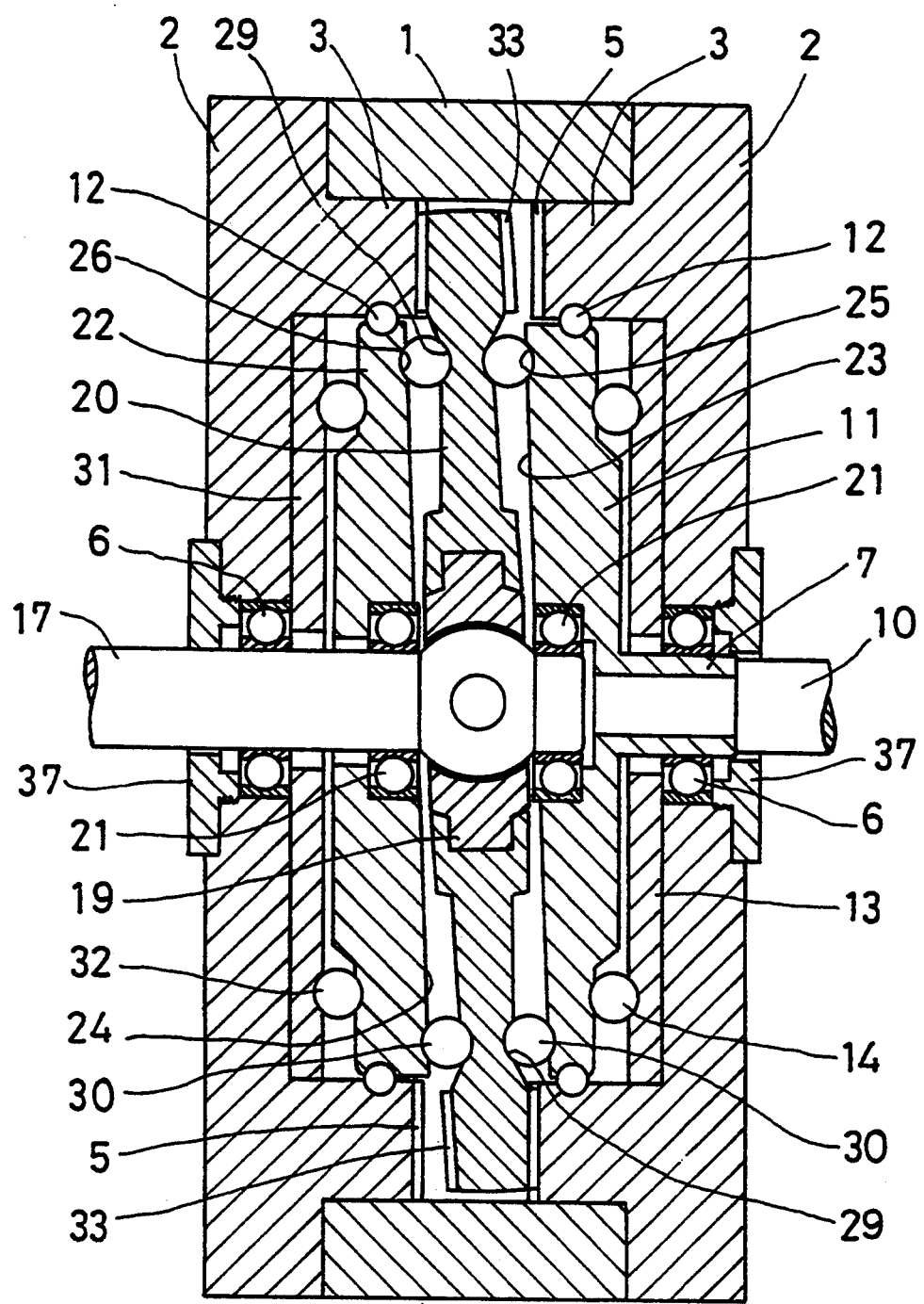
FIG. 1 is a vertical sectional view of the first embodiment.
Figure 2:
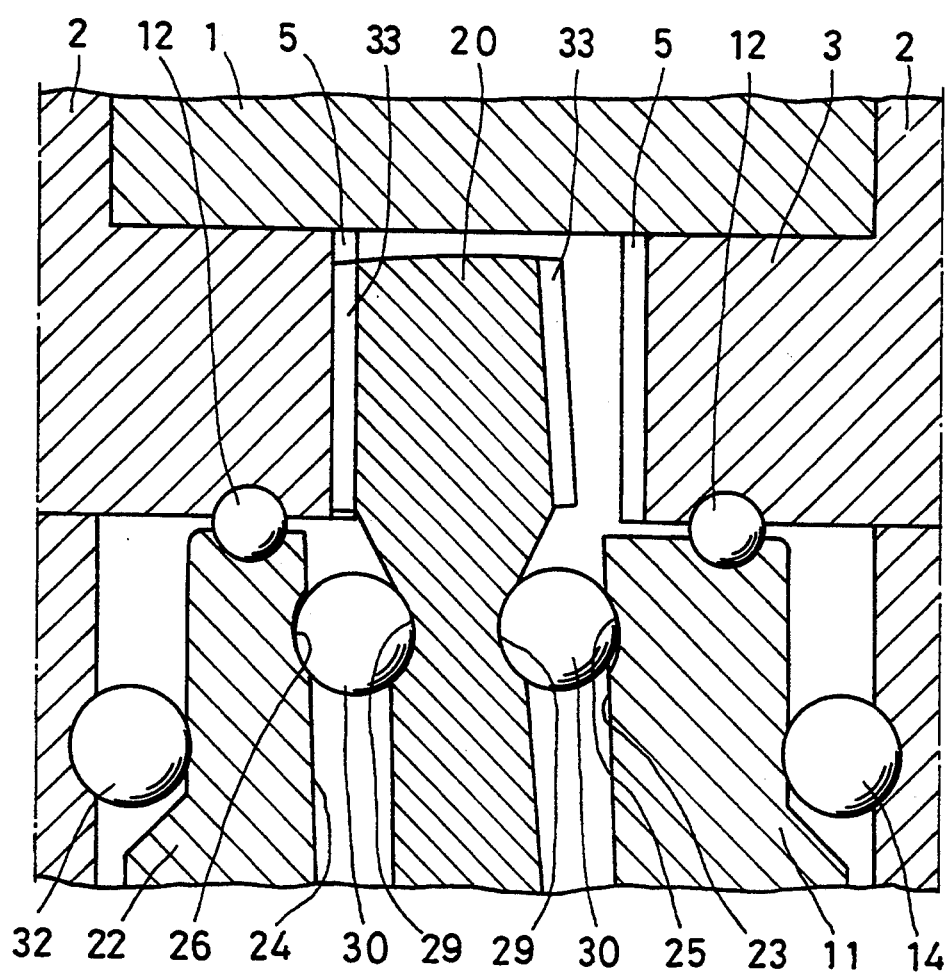
FIG. 2 is an enlarged vertical sectional view of a portion of the same.

A cylindrical member 7 is rotatably inserted through a bearing 6 in a hole formed in the center of the side plate 2 on the righthand side of FIG. 2. An input shaft 10 is secured to the cylindrical member 7. An input plate 11 is concentrically and integrally secured to the inner end of the cylindrical member 7 so as to be rotatable radially inwardly of the protrusion 3. A plurality of balls 12 are rollably disposed between a groove formed in the outer circumferential surface of the plate 11 and a groove formed in the inner circumferential surface of the protrusion 3.

A disk-shaped pressure plate 13 is pressed against the inner surface of main body of the side plate 2 at the input shaft side. A plurality of balls 14 are rollably disposed between the plate 13 and the plate 11 in a circular groove concentrically formed in the back of the input plate 11.

An output shaft 17 extends through the center of the other side plate 2 and is rotatably supported thereon through a bearing 6. An output plate 20 is mounted through a universal joint 19 on the output shaft 17 near its inner end so as to be rotatable with and inclinable relative to the output shaft 17.

The output shaft 17 has its inner end rotatably supported on the central part of the input plate 11 through a bearing 21.

A disk-shaped balance plate 22 is rotatably mounted on the output shaft 7 through the bearing 21 so as to be disposed radially inwardly of the other protrusion 3. A plurality of balls 12 are disposed in a groove formed in the outer circumferential surface of the balance plate 22 and in a groove formed in the inner circumferential surface of the protrusion 3.

The opposing surfaces 23, 24 of the input plate 11 and the balance plate 22 are inclined by a predetermined angle with respect to their center of rotation. Annular grooves 25, 26 are formed in the inclined surfaces 23, 24, respectively.

The output plate 20 is provided in both side surfaces thereof with a plurality of semi-spherical recesses 29 that are arranged in a circle concentric about its center of rotation. Balls 30 are rotatably received in the respective recesses 29 and also in the groove 25 in the input plate 11 and the groove 26 in the balance plate 22.

The grooves 25, 26 have such a width as to gradually increase outwards as shown in FIG. 2 so that the balls 30 can move freely therein as the output plate 20 makes a pivoting motion.

A pressure plate 31 is pressed against the inner surface of the main body of the side plate 2 at the output side. A plurality of balls 32 are received in circular grooves formed in the opposite surfaces of the plate 31 and the balance plate 22.

Movable gears 33 are formed on both sides of the output shaft 20 near its outer circumference so as to be brought into meshing engagement with the gears 5 on the protrusions 3. There is a slight difference between the number of teeth of each gear 33 and that of each gear 5.

Figure 5:
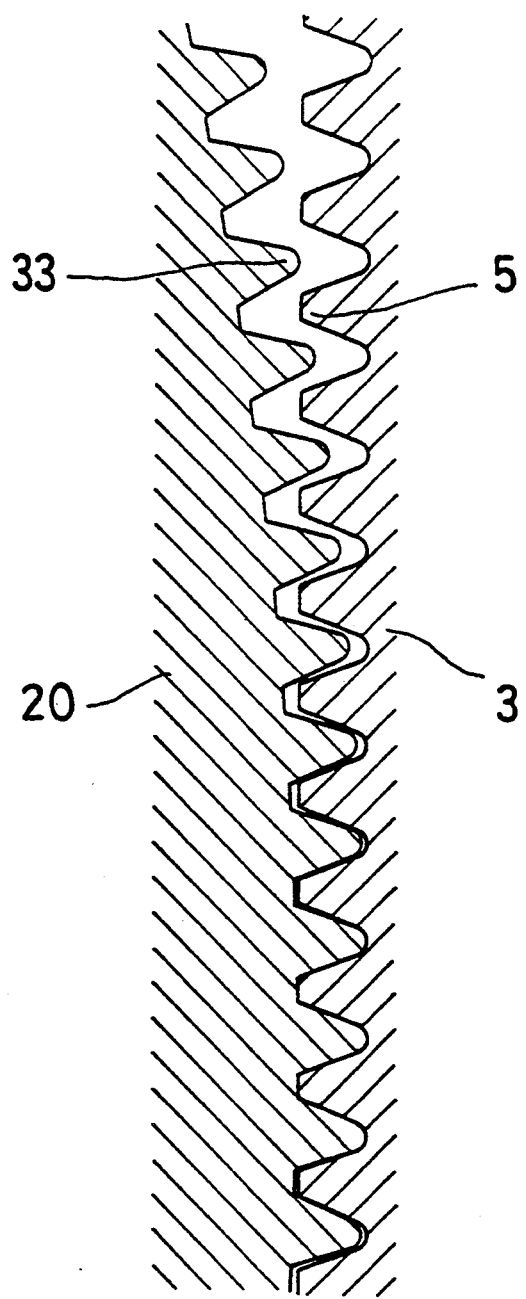
FIG. 5 is an enlarged sectional view showing how gears mesh with each other.

FIG. 5 shows one example of the shapes of the gears 5 and 33. The gear teeth have different shapes provided they have basically an involute profile. Their gear teeth are also not limited to those of a spur gear as shown but may be those of helical gears, spiral bevel gears, etc.

The side plates 2 may be so adapted as to be slightly movable in a circumferential direction with respect to the frame 2. This makes it possible to adjust the back lash between the gears 5 and 33, produced during assembly, by slightly moving the side plates 2. Also, a suitable pressure can be applied to the pressure plates 13, 31 through bearings 6 by screwing nuts 37 into female threads formed in the shaft holes of the side plates 2.

Now in operation, as the input shaft 10 rotates, the input plate 11 secured to the input shaft 10 will rotate therewith. The output plate 20 is kept inclined by contact with the inclined surface 23 of the input plate 11. It will sway while the teeth of the gears 33 on both sides thereof are brought into meshing engagement with the fixed gears 5 on the protrusions 3 one after another. Thus, as the input shaft 10 and thus the input plate 11 make one full turn, the output plate 20 will turn in either direction by a distance determined by the difference in the numbers of teeth between the gears 33 and 5.

If, for example, each gear 5 has 100 teeth and each gear 33 has 101 teeth, the output shaft 17 will rotate at the speed equal to 1/100 of the rotating speed of the input shaft 10.

SECOND EMBODIMENT

Figure 6:
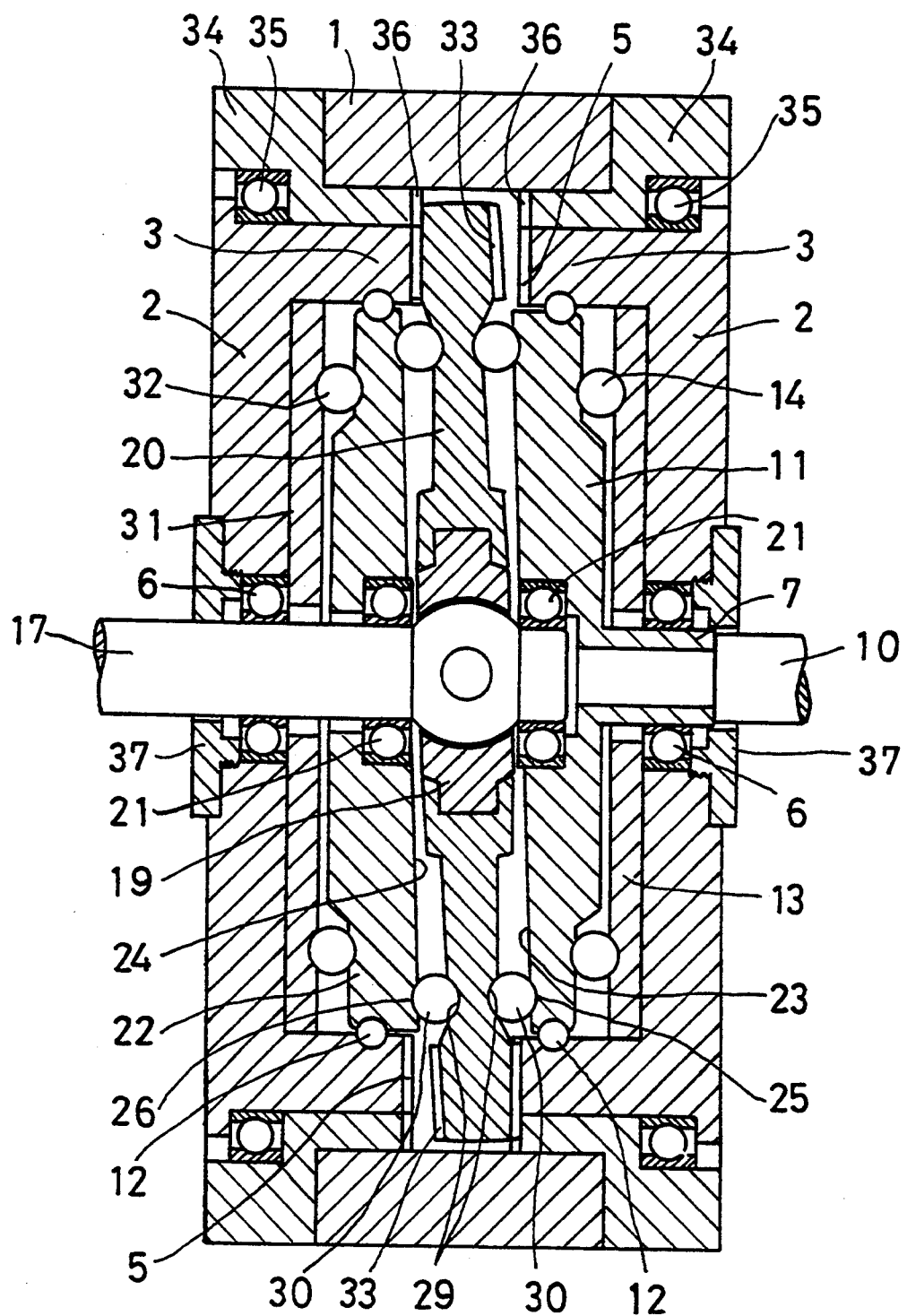
FIG. 6 is a vertical sectional view of the second embodiment.

FIG. 6 shows the second embodiment, in which a rotary ring 34 is rotatably mounted on the outer circumference of each side plate 2 through a bearing 35. On the inner surfaces of the rotary rings 34 are formed gears 36 each having a slightly smaller or larger number of teeth than the gears 5. The teeth of the gears 33 on both sides of the output plate 20 are adapted to be brought into meshing engagement with the gears 5 and 36.

Otherwise, this embodiment has the same structure as the first embodiment. Thus, like elements are denoted by like numerals and their description is omitted.

The second embodiment is the same as the first embodiment in that the output shaft 17 rotates at a much slower speed than the input shaft 10 but differs therefrom in that the rings 34 are mounted so as to be freely rotatable with respect to the fixed frame 1 and side plates 2. Thus, as the input shaft 10 is rotated, not only is the output shaft 17 rotated at a much slower speed than the input shaft as in the first embodiment, but also the rings 34 are rotated at a significantly slow speed which is determined by the difference in the numbers of teeth between the gears 36 and 5.

In this embodiment, gears or pulleys may be formed on the outer circumferential surfaces of the rings 34 so as to be driven by rotating the input shaft 10. In other words, in this embodiment, three different outputs are obtainable with the single input shaft 10.

In both of the embodiments, the balance plate 22, the pressure plate 31 and the balls kept in contact with these members may be omitted.

What is claimed is:

1. A speed reducer comprising: a pair of side plates arranged opposite to each other and formed on their surfaces opposite to each other with ring-shaped protrusions concentric to and spaced apart from each other, said protrusions having fixed gears at surfaces thereof opposing each other; an input shaft extending through the center of one of said side plates and supported so as to be rotatable; a circular input plate fixed to an inner end of said input shaft, one of the surfaces of said input plate facing the other of said side plates and being inclined with respect to the center of rotation of said input plate; an output shaft extending through the center of the other of said side plates and supported so as to be rotatable; a universal joint provided on an inner end of said output shaft; an output plate mounted on the inner end of said output shaft through said universal joint so as to be rotatable with and inclinable relative to said output shaft, said output plate being provided on both sides thereof near its outer circumference with movable gears each having teeth whose number is different from the number of teeth of each said fixed gear and adapted to be brought into meshing engagement with said fixed gears, and said output plate being supported so as to be kept substantially parallel to said inclined surface of said input plate while it sways as said input plate rotates, whereby the teeth of said movable gears are brought into meshing engagement with said fixed gears on said protrusions one after another at diametrically opposite positions from each other.

* * * * *